US012492071B2

(12) United States Patent
Chenvainu et al.

(10) Patent No.: US 12,492,071 B2
(45) Date of Patent: Dec. 9, 2025

(54) CASSETTE WITH NON-UNIFORM LINER CAVITY

(71) Applicant: Angelcare USA, LLC, Newark, DE (US)

(72) Inventors: Alexander Chenvainu, Mahwah, NJ (US); Paul Dansreau, Shelton, CT (US); Neil MacDonald, Naugatuck, CT (US)

(73) Assignee: Angelcare USA, LLC, Newark, DE (US)

( * ) Notice: Subject to any disclaimer, the term of this patent is extended or adjusted under 35 U.S.C. 154(b) by 255 days.

(21) Appl. No.: 15/961,097

(22) Filed: Apr. 24, 2018

(65) Prior Publication Data

US 2018/0237218 A1 Aug. 23, 2018

Related U.S. Application Data

(62) Division of application No. 15/417,746, filed on Jan. 27, 2017, now abandoned.
(Continued)

(51) Int. Cl.
*B65F 1/06* (2006.01)
*B65F 1/16* (2006.01)

(52) U.S. Cl.
CPC .............. *B65F 1/062* (2013.01); *B65F 1/163* (2013.01); *B65F 2210/1026* (2013.01);
(Continued)

(58) Field of Classification Search
CPC ......... B65B 67/1277; B65B 9/15; B65B 9/18; B65F 1/062; B65F 1/067; B65F 1/065;
(Continued)

(56) References Cited

U.S. PATENT DOCUMENTS 3,665,522 A * 5/1972 Backlund ............. A47K 11/026
4/484
3,693,193 A * 9/1972 May ..................... A47K 11/026
4/484
(Continued)

FOREIGN PATENT DOCUMENTS

DE 202011001414 U1 * 4/2012 ........... A47K 11/026
EP 2960182 A1 * 12/2015 .............. B65F 1/062
(Continued)

OTHER PUBLICATIONS

International Search report of PCT/US17/15273, dated Apr. 5, 2017.
(Continued)

*Primary Examiner* — Allan D Stevens
(74) *Attorney, Agent, or Firm* — Norton Rose Fulbright US LLP

(57) ABSTRACT

A cassette for disposing waste is provided having a variable cross-sectional geometry. The cross-sectional geometry varies at least at two locations around the periphery of the cassette such that a first maximum height at a first location is different than a second maximum height at a second different location, and the first maximum width at a first location is different than a second maximum width at a second location.

9 Claims, 8 Drawing Sheets

Related U.S. Application Data

(60) Provisional application No. 62/288,069, filed on Jan. 28, 2016.

(52) U.S. Cl.
CPC ... *B65F 2210/129* (2013.01); *B65F 2210/167* (2013.01); *B65F 2230/152* (2013.01); *B65F 2240/132* (2013.01)

(58) Field of Classification Search
CPC ....... B65F 2240/132; B65F 2210/1675; A47K 11/026
USPC .................................................... 220/495.07
See application file for complete search history.

(56) References Cited

U.S. PATENT DOCUMENTS

| | | | |
|---|---|---|---|
| 4,519,104 A * | 5/1985 | Nilsson | E03D 5/012 |
| | | | 4/484 |
| 5,651,231 A | 7/1997 | Garland | |
| 5,765,339 A | 6/1998 | Garland | |
| 6,851,251 B2 | 2/2005 | Stravitz | |
| 7,146,785 B2 | 12/2006 | Stravitz | |
| 7,434,377 B2 | 10/2008 | Stravitz et al. | |
| 7,503,152 B2 | 3/2009 | Stravitz et al. | |
| 7,503,159 B2 | 3/2009 | Stravitz et al. | |
| 7,594,376 B2 | 9/2009 | Chomik | |
| 7,617,659 B2 | 11/2009 | Stravitz et al. | |
| 7,694,493 B2 | 4/2010 | Stravitz et al. | |
| 7,696,711 B2 | 4/2010 | Pollack et al. | |
| 7,708,188 B2 | 5/2010 | Stravitz et al. | |
| 7,712,285 B2 | 5/2010 | Stravitz et al. | |
| 7,958,704 B2 | 6/2011 | Stravitz et al. | |
| 2003/0121923 A1 | 7/2003 | Morand et al. | |
| 2003/0131569 A1 | 7/2003 | Chomik et al. | |
| 2005/0193692 A1 | 9/2005 | Stravitz et al. | |
| 2006/0130438 A1 | 6/2006 | Stravitz et al. | |
| 2007/0219425 A1* | 9/2007 | Moore | A47K 11/026 |
| | | | 600/300 |
| 2008/0272140 A1* | 11/2008 | Mowers | B65F 1/062 |
| | | | 221/69 |
| 2009/0255045 A1* | 10/2009 | Sakurai | A47K 11/026 |
| | | | 4/484 |
| 2012/0091295 A1 | 4/2012 | Morand | |
| 2015/0164293 A1 | 6/2015 | Shimanuki | |
| 2016/0083182 A1* | 3/2016 | Dunn | B65F 1/062 |
| | | | 206/409 |
| 2017/0071422 A1* | 3/2017 | Costa | A47K 11/026 |

FOREIGN PATENT DOCUMENTS

| | | | | |
|---|---|---|---|---|
| EP | 3575242 A1 * | 12/2019 | | B65F 1/062 |
| FR | 2811650 A1 | 1/2002 | | |
| JP | H0639804 U | 5/1994 | | |
| WO | WO-2015087048 A1 * | 6/2015 | | B65F 1/062 |

OTHER PUBLICATIONS

International Search Report of PCT/US17/15288, dated Apr. 5, 2017.

International Search Report of PCT/US17/015288, dated May 4, 2017.

Restriction Requirement for U.S. Appl. No. 15/417,746, mailed Feb. 14, 2018.

* cited by examiner

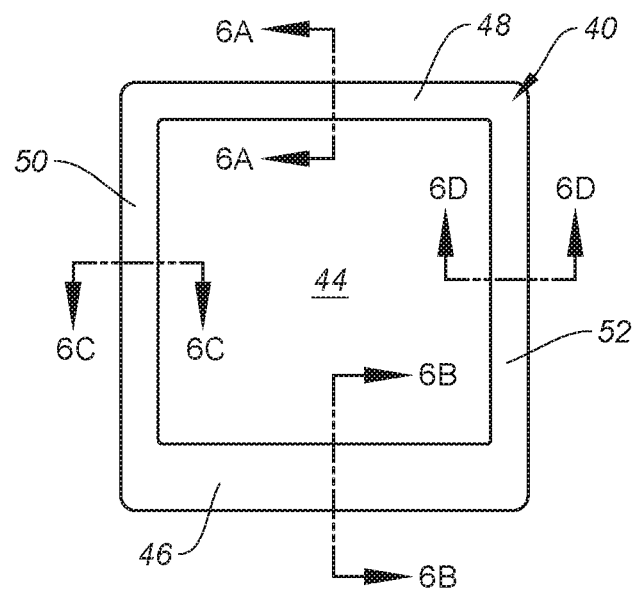
*FIG. 6*
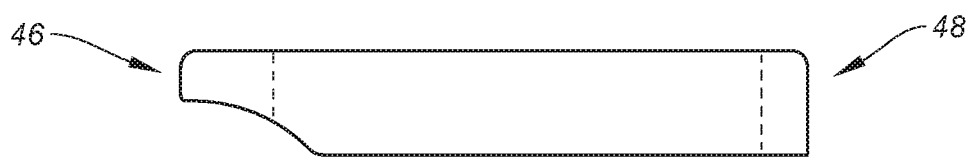
*FIG. 7*
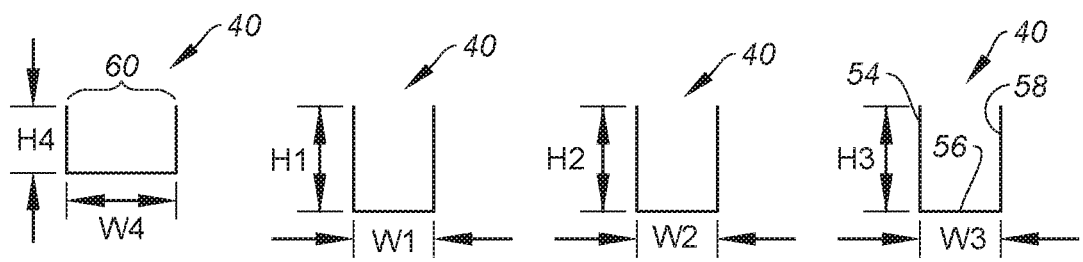
*FIG. 6B*  *FIG. 6A*  *FIG. 6C*  *FIG. 6D*

CASSETTE WITH NON-UNIFORM LINER CAVITY

CROSS-REFERENCE TO RELATED APPLICATIONS

This application is a divisional application of copending U.S. patent application Ser. No. 15/417,746, filed Jan. 27, 2017, which claims the benefit of priority of U.S. Provisional Patent Application Ser. No. 62/288,069, filed Jan. 28, 2016, the entirety of which are incorporated herein.

BACKGROUND OF THE INVENTION

1. Technical Field

The present disclosure relates to an apparatus for packaging disposable material or objects into a tubular flexible plastic film material in general, and to cassettes for providing the tubular flexible plastic film material in particular.

2. Background Information

Waste disposal devices that include a film-dispensing cassette are commonly used to throw away odorous waste, such as diapers and litter. In such waste disposal devices, the film-dispensing cassettes are supported at an opening of a bin and dispense a tubular film projecting into the inner cavity of the bin of the waste disposal device. The free end of the tubular film can be closed to define a bag-like structure. Often, the waste disposal device includes an internal mechanism that closes the bag shut (e.g., by clamping, twisting, etc.), thereby isolating the waste in the bag below the internal mechanism, and capturing the odors in the bag.

SUMMARY OF THE APPLICATION

According to an aspect of the present disclosure, a film-dispensing cassette for a waste disposal device is provided. The cassette has a variable geometry. The cassette has an inner cavity edge defining a central opening through which liner film is disposed to collect and hold waste. The cassette has an outer cavity edge defining the outer periphery of the cassette. The inner cavity edge also defines an inner cavity wall. The outer cavity edge also defines and outer cavity wall. The inner cavity wall and outer cavity wall are joined by a bottom wall and/or a top panel, thereby forming a liner cavity. The bottom wall has an inner edge and an outer edge. The top panel has an inner edge and an outer edge. In certain embodiments, the inner edge of any wall or panel coincides with or is proximal to the inner edge of any adjacent wall or panel thereby forming a portion of the liner cavity, and likewise is true for outer edges of such walls and/or panels.

In some embodiments, the cassette has only portions of the liner cavity, for instance, the outer or inner cavity wall the bottom wall, or top panel. In these embodiments, the wall, panel, surface or edge defining such a wall, panel or surface, may vary in at least at two positions along the outer perimeter or inner perimeter of the cassette. Optionally, these embodiments have a liner film attached to such wall or panel at a first end of the liner film, and the second end of the liner film is closed, closeable, sealed, sealable to form a bag-like structure. Such bags may have pleats or folds to provide expansive storage properties. In such embodiments, the inner wall, outer wall, surface, bottom wall, and/or top panel may have a variable geometry such that the height is variable along the wall or surface, or the width is variable along the wall, panel or surface, or both the height and width are variable.

The film dispensing cassette has a central passage through which film extends and creates a barrier between the waste received within the film and the body of the disposal device. The liner film is at least partially contained, prior to use and during use, within a liner cavity in the cassette. The liner film is at least partially contained within the liner cavity until the liner film is exhausted and the cassette needs to be replaced. The liner cavity has a cross-sectional geometry that varies around a perimeter of the cassette at least at two different points.

The liner cavity, for example, has a first position along the perimeter of the cassette with a cross-sectional geometry generally equal to a second position along the perimeter of the cassette having a second cross-sectional geometry. The first cross-sectional geometry is different from the second cross-sectional geometry.

In further embodiments, the cassette has an outer cavity wall generally opposite the inner cavity wall and defining the outer perimeter of the liner cavity. In further embodiments, the cassette includes a bottom cavity wall that at least partially connects the outer cavity wall and the inner cavity wall. In yet other embodiments, the cassette has a top panel that assists in the at least partial containment of the liner film within the liner cavity (prior to and during use until the liner film is exhausted). In some such embodiments, the top panel is sized such that a generally uniform cavity opening is provided and enables generally consistent dispensation of the liner film at any given position along the perimeter of the cassette, regardless of whether the maximum height and/or width at such positions are the same or different.

In some embodiments, the geometry of the cassette is such that, when resting on a flat surface such as a shelf or table, the cassette is balanced and stable so as not to rock. Further, when two or more cassettes are stacked together, the top of each cassette is designed to geometrically mate with the bottom of another cassette so as to maintain relative position to each other.

The present disclosure is described herein in terms of aspects and embodiments of those aspects that include elements or features that may be included with the aspects. The identified embodiments may be included with the aspect of the invention singularly or in combination with any of the other identified embodiments as will be described herein below in the Detailed Description. The features and advantages of the present invention will become apparent in light of the detailed description of the invention provided below, and as illustrated in the accompanying drawings.

BRIEF DESCRIPTION OF THE DRAWINGS

FIG. 6 is a diagrammatic top view of a film-dispensing cassette embodiment.

FIG. 6A is a diagrammatic sectional view of the cassette shown in FIG. 6, showing a liner cavity cross-section at section 6A-6A.

FIG. 6B is a diagrammatic sectional view of the cassette shown in FIG. 6, showing a liner cavity cross-section at section 6B-6B.

FIG. 6C is a diagrammatic sectional view of the cassette shown in FIG. 6, showing a liner cavity cross-section at section 6C-6C.

FIG. 6D is a diagrammatic sectional view of the cassette shown in FIG. 6, showing a liner cavity cross-section at section 6D-6D.

FIG. 7 is a diagrammatic side view of the cassette embodiment shown in FIG. 6.

DETAILED DESCRIPTION

Figure 1:
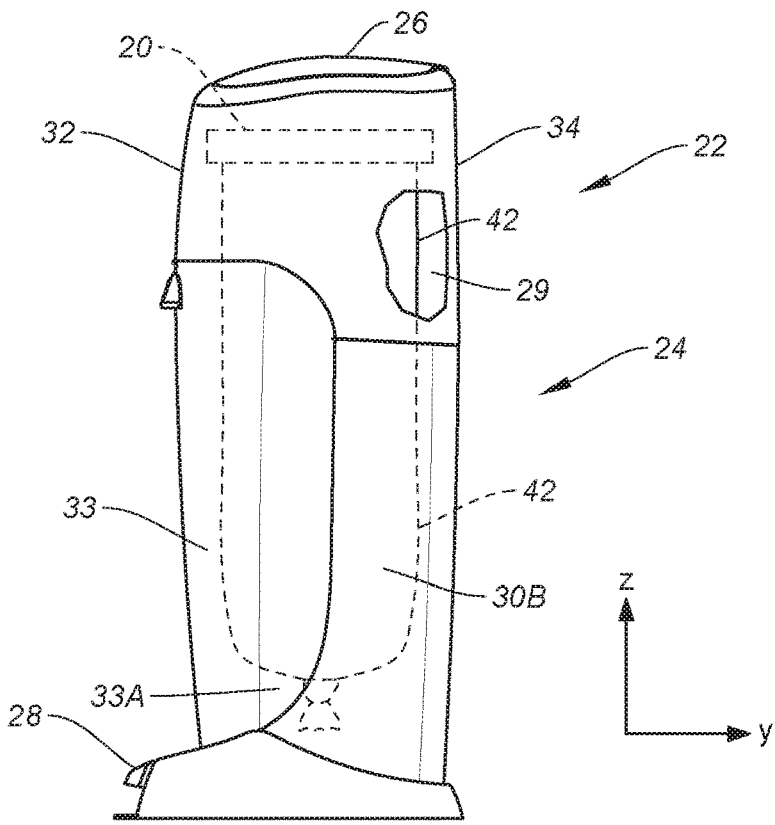
FIG. 1 is a side perspective of a waste disposal device.

Referring now to the drawings, a film-dispensing cassette 20 for use in a waste-disposal device is provided. The waste disposal device and the cassette 20 may be used for storing any type of waste items, but are well suited for the disposal of diapers, feminine hygiene, adult incontinence, and pet waste. The cassette includes a film that is at least partially stored within the cassette, which film is configurable to form a bag-like structure. The cassette 20 includes a central passage 44 through which waste is passed. The present cassette 20 may be used with a variety of different types of waste-disposal devices, and therefore is not limited to any particular type of waste-disposal device 22. To facilitate the description of the present cassette 20, an exemplary non-limiting embodiment of a waste disposal device 22 with which the present cassette 20 may be used is provided below.

The waste disposal device 22 includes a housing 24, a lid 26, and a foot pedal 28. To facilitate the description herein, the waste disposal device 22 is described herein as having a width that extends along an X-axis, a depth that extends along a Y-axis, and a height that extends along a Z-axis; where X, Y, and Z are orthogonal axes. The housing 24 may also be described as having two side panels 30A, 30B that extend depthwise between a front panel 32 and a rear panel 34. The housing 24 may include a door 33 that provides access to an interior storage region 29. In some embodiments, the housing has a bin 33 a. The bin 33 a can be connectable to the door 33 such that bin 33 a is removable when the door 33 is opened and/or removable from the housing 24.

Depressing the foot pedal 28 operates a linkage (not shown) that causes the lid 26 to open and provides access to the inner storage region 29 of the waste disposal device 22. In some waste-disposal devices 22, depressing the foot pedal 28 also causes a mechanism within the waste-disposal device 22 (e.g., a liner clamping assembly) to move to an "open position" where it does not impede deposit of waste within a liner disposed within the inner storage region. When the foot pedal 28 is released, the lid 26 closes automatically and the mechanism returns to its normally closed position (e.g., an "at rest" state). In the closed position, the mechanism clamps (or otherwise closes) the liner (e.g., to mitigate odor emanation).

Figure 2:
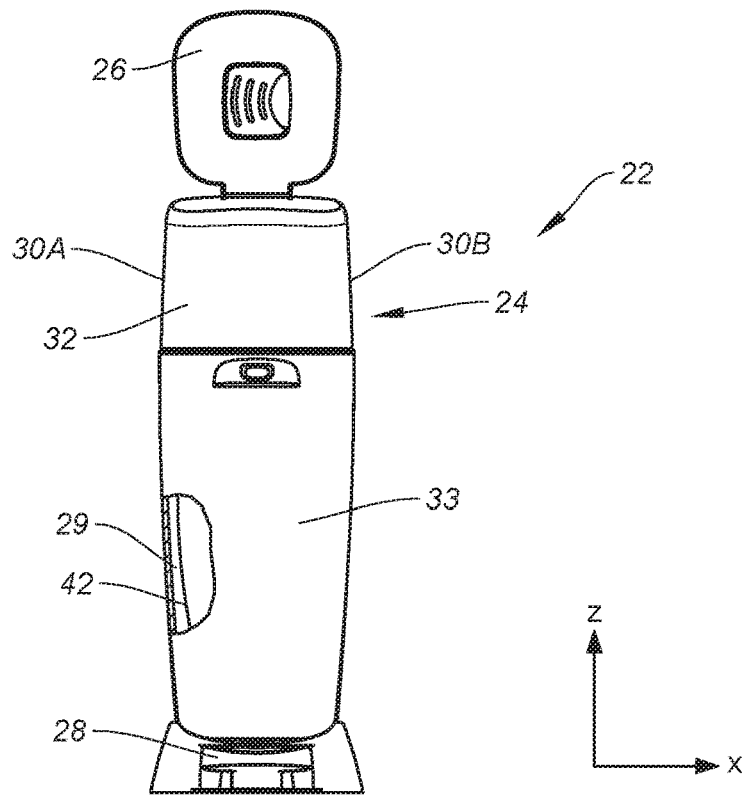
FIG. 2 is a front perspective of a waste disposal device, illustrating a lid rotated to an open position.

Some waste disposal devices 22 are configured to permit insertion or removal of a film-dispensing cassette 20 in the portion of the housing disposed vertically below the lid 26. The exemplary embodiment shown in FIGS. 1 and 2 has such a configuration. Other waste disposal devices 22 may be configured to permit insertion or removal of a film-dispensing cassette 20 from a front surface of the housing 24. Embodiments of the present film-dispensing cassette 20 may be used in either of these configurations, and as indicated above, the present cassette 20 is not limited to use in any particular waste disposal device 22.

Figure 3:
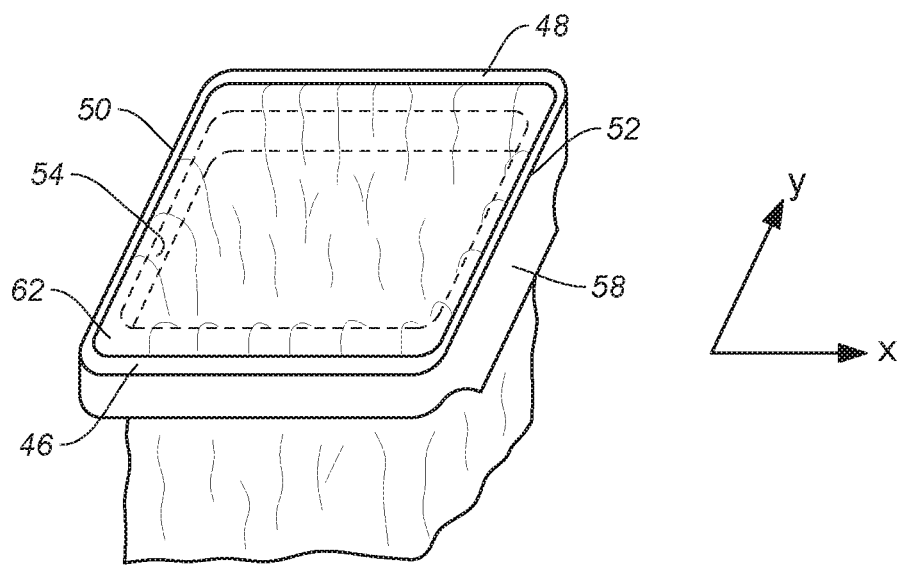
FIG. 3 is a diagrammatic perspective view of a film-dispensing cassette with a segment of liner film drawn out of a liner cavity and through a central passage of the cassette.
Figure 4:
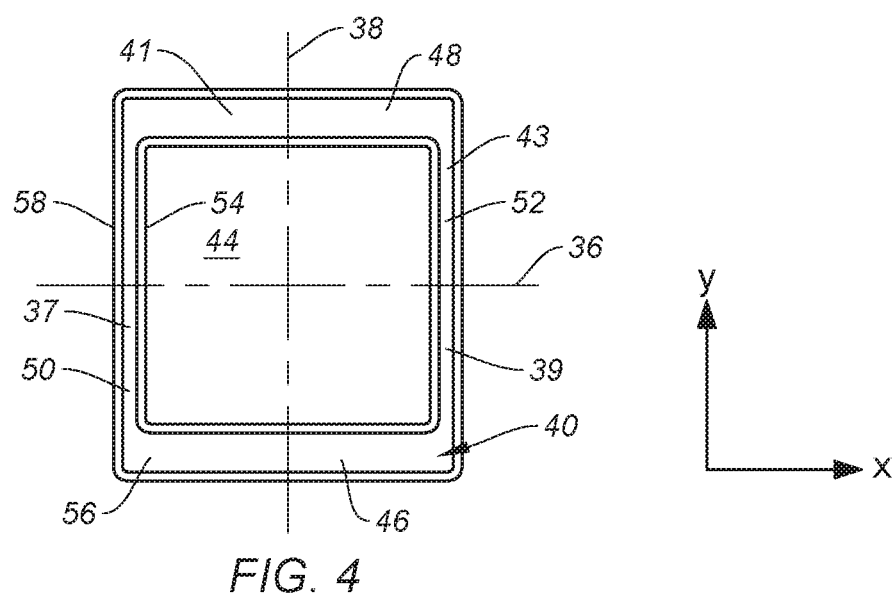
FIG. 4 is a diagrammatic top view of a film-dispensing cassette embodiment.

Referring to FIGS. 3-5 and 13-14, the present film-dispensing cassette 20 may be described as having a width-wise extending axis 36 (e.g., extending in an X-axis direction) and a depthwise extending axis 38 (extending in a Y-axis direction) that orthogonally bisect a center point. In the X-Y plane, the cassette 20 may be symmetrical relative the one or both axes 36, 38, or may be non-symmetrical relative to one or both axes 36, 38. The cassette 20 includes a liner cavity 40 for containing a supply of liner film 42 and a central passage 44. The liner cavity 40 may be described as having a forward region 46, an aft region 48, a first side region 50, and a second side region 52. The first and second side regions 50, 52 extend between the forward and aft regions 46, 48, on opposite sides of the central passage 44. As shown in FIG. 4, axes 36, 38 split cassette 20 into four general sectors, a forward first side region 37, a forward second side region 39, an aft first side region 41, and an aft second side region 43.

Figure 5:
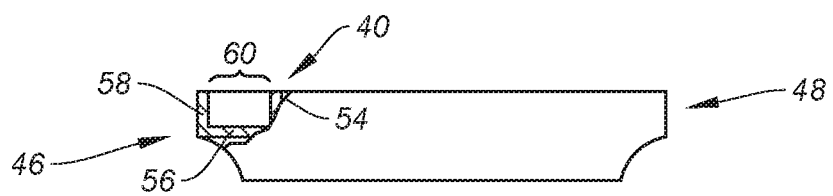
FIG. 5 is a diagrammatic side view of a film-dispensing cassette embodiment.
Figure 8:
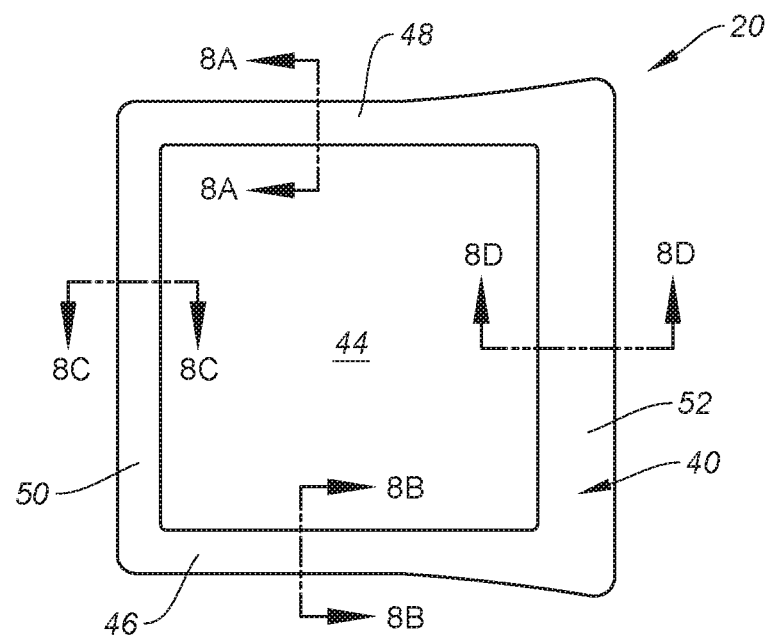
FIG. 8 is a diagrammatic top view of a film-dispensing cassette embodiment.

The liner cavity 40 may assume a variety of configurations to hold the supply of liner film 42. In the embodiment shown in FIGS. 3-5 and 13-14, the liner cavity 40 is defined by an inner cavity wall 54, a bottom cavity wall 56, and an outer cavity wall 58. The inner cavity wall 54 is radially inside of the outer cavity wall 58 (e.g. the inner cavity wall 54 is disposed closer to the center of the central passage 44 than the outer cavity wall 58) and the bottom cavity wall 56 extends between and at least partially connects with the inner cavity wall 54 and the outer cavity wall 58. Although the inner cavity wall 54, bottom cavity wall 56, and outer cavity wall 58 are shown in FIGS. 3-5 as having a solid wall structure, they are not limited to a solid wall configuration; e.g., one or more of the inner cavity wall 54, bottom cavity wall 56, and outer cavity wall 58 may assume any configuration adequate to hold the supply of liner film 42. The liner cavity 40 may be formed as a continuous one-piece structure (e.g., the inner and outer cavity walls 54, 58 and bottom cavity wall 56 formed as a continuous one-piece structure), or they may be multiple pieces connected together.

The inner cavity wall 54, bottom cavity wall 56, an outer cavity wall 58 are relatively configured to give the liner cavity 40 an open channel shape. The inner cavity wall 54 and the outer cavity wall 58 may be parallel to one another (e.g., in the Z-axis direction), or they may be non-parallel (e.g., skewed at an angle) relative to one another, or the distance between the two may vary at different points. The bottom cavity wall 56 may be planar or non-planar (e.g., arcuate). The bottom cavity wall 56 may extend perpendicular to the inner and outer cavity walls 54, 58, or it may be skewed at an angle other than ninety degrees. In the embodiments shown in FIGS. 3-5, the opening 60 (e.g., liner cavity opening) of the liner cavity 40 extends between a top surface edge of the inner cavity wall 54 and a top surface edge of the outer cavity wall 58. In the embodiment shown in FIGS. 3-5, the inner cavity wall 54 defines the geometry of the central passage 44. In alternative embodiments, the central passage 44 may be defined by a structure other than the inner cavity wall 54.

The cross-sectional geometry of the liner cavity 40 varies depending upon the location of the cross-section around the perimeter of the cassette 20. The term "cross-sectional geometry" of the liner cavity 40 (at a given perimeter position) is defined herein as the geometry of a cross-sectional plane (e.g., extending in the X-Z plane, or the Y-Z plane, etc.) that is perpendicular to inner cavity wall 54 and the outer cavity wall 58. For purposes of describing the cross-sectional geometry of the liner cavity 40, the "height" of the liner cavity 40 extends in a Z-axis direction from the opening 60 of the liner cavity 40 to the interior surface of the bottom cavity wall 56, and the "width" of the liner cavity 40 extends between the interior surfaces of the inner and outer cavity walls 54, 58. A liner cavity 40 according to the present disclosure includes at least two different cross-sectional geometries; e.g., a first cross-sectional geometry with a maximum height (Hmax1) that differs from the maximum height (Hmax2) of a second cross-sectional geometry, and a maximum width (Wmax1) that differs from the maximum width of the second cross-sectional geometry (Wmax2). Further varying geometries are provided for, such as Hmax3 . . . HmaxN, and Wmax3 . . . . WmaxN. Stated another way, the maximum height at a first location along the perimeter of the cassette 20, such as in the forward region 46, may be different than the maximum height along the perimeter of the cassette 20 in the first side region 50, as shown in FIG. 3. As demonstrated by the exemplary embodiment in FIG. 4, the aft region 48 is shown to have a maximum width that is different than the maximum width in the second side region 52.

Typically, the cross-sectional area of the liner cavity 40 (i.e., the area of the cross-sectional plane that is perpendicular to inner cavity wall 54 (i.e. a vertical slice) and the outer cavity wall 58 that resides within the liner cavity 40; i.e., in the ZY or ZX plane) remains substantially constant around the cassette perimeter to enable the liner cavity 40 to accept a uniform volume of liner film 42 around the cassette perimeter.

The cassette 20 embodiment shown in FIGS. 6 and 7, for example, has a liner cavity 40 with a cross-sectional geometry that varies around the perimeter of the liner cavity 40. FIGS. 6A-6D are diagrammatic cross-sections of the liner cavity 40 at the respective positions indicated in FIG. 6; i.e., an aft region position (FIG. 6A), at a forward region position (FIG. 6B), a first side region position (FIG. 6C), and a second side region position (FIG. 6D). As can be seen in FIGS. 6A-6D, the liner cavity 40 has a height H1 and a width W1 at the aft region position, a height H2 and a width W2 at the first side region position, a height H3 and a width W3 at the second side region position, and a height H4 and a width W4 at the forward region position. In this embodiment, the height and width at the liner cavity side region positions are substantially equal one another (i.e., H2=H3 and W2=W3), the height of the liner cavity 40 at the aft region position is greater than the height of the liner cavity 40 at the forward region position (i.e., H1>H4), and the width of the liner cavity 40 at the aft region position is less than the width of the liner cavity 40 at the forward region position (i.e., W1<W4). The cross-sectional area of the liner cavity 40 at the aforesaid perimeter positions are substantially equal one another. In the particular configuration of this embodiment shown in FIGS. 6A-6D, the cross-sectional geometry of the liner cavity 40 in the aft region 48 and a substantial portion of each side region 50, 52 is the same, the cross-sectional geometry of the liner cavity 40 in the forward region 46 differs from the cross-sectional geometry of the aft and side regions, and a portion of each side region transitions between the two cross-sectional geometries (e.g., see FIG. 7).

In an alternative configuration (see FIGS. 8, 8A-8D, and 9), the cross-sectional geometries of the liner cavity 40 of the first side region 50, a portion of the aft region 48, and a portion of the forward region 46 may be the same (e.g., each have width W5 and height H5), and the cross-sectional geometry of the second side region 52 (e.g., width W6 and height H6) may differ therefrom. In this configuration, a portion of the aft region 48 and the forward region 46 transition between the two cross-sectional geometries.

In another alternative configuration, the cross-sectional geometry of the liner cavity 40 may be substantially constant in the first and second side regions 50, 52 and substantially constant in the forward and aft regions 46, 48. The cross-sectional geometry of the liner cavity 40 in the side regions 50, 52 is, however, different (e.g., narrower widthwise) from the cross-sectional geometry of the forward and aft regions 46, 48. FIGS. 10, 10A-10D, and 11 illustrate such a geometry wherein the cross-sectional geometry of the forward and aft regions 46, 48 has a height H7 and a width W7, and the cross-sectional geometry of the first and second liner cavity side regions 50, 52 has a height H8 and a width W8. The height of the liner cavity forward and aft regions 46, 48 is less than the height of the liner cavity side regions 50, 52 (H7<H8), and the width of the liner cavity forward and aft regions 46, 48 is greater than the width of the liner cavity side regions 50, 52 (W7>W8). This liner cavity 40 configuration permits a widthwise narrower cassette 20 configuration relative to a cassette 20 with a liner cavity 40 having uniform cross-sectional geometry around the entire perimeter for a given central passage 44 maximum width. A further cassette 20 embodiment may adopt the converse configuration; e.g., one in which the cross-sectional geometry of the liner cavity 40 in the side regions 50, 52 is wider widthwise than the cross-sectional geometry of the forward and aft regions 46, 48. This liner cavity 40 configuration permits a depthwise narrower cassette 20 configuration relative to a cassette 20 with a liner cavity 40 having uniform cross-sectional geometry around the entire perimeter for a given central passage 44 maximum depth.

In some embodiments, the liner cavity 40 does not have a uniform cross-sectional geometry about the entire inner upper edge 54a, inner lower edge 54b, or outer upper edge 58a, or outer lower edge 58b. In some such embodiments, the inner perimeter as defined by inner upper edge 54a or inner lower edge 54b, or outer perimeter as defined by 58a or 58b, with respect to the other, undergo a translation such that a further narrower region along a portion of the liner cavity 40 is achieved without growing the height in that region. In some such embodiments, a maximum dimension (i.e. widthwise and/or depthwise) can be achieved in a region of the cassette 20 to provide an advantageous configuration for waste disposal, as contemplated by the present disclosure. Accordingly, the translation can occur with respect to the X and/or Y axes such that the shift is in the XY plane.

Figure 9:
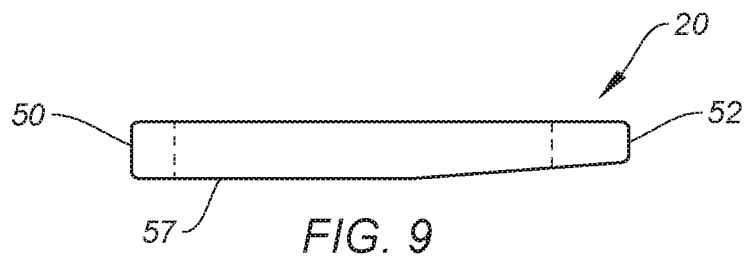
FIG. 9 is a diagrammatic side view of the cassette embodiment shown in FIG. 8.
Figure 8A:
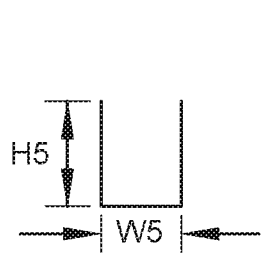
FIG. 8A is a diagrammatic sectional view of the cassette shown in FIG. 8, showing a liner cavity cross-section at section 8A-8A.
Figure 8B:
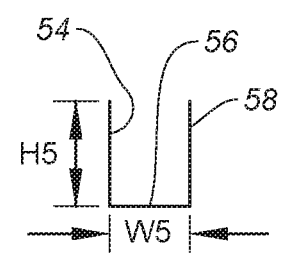
FIG. 8B is a diagrammatic sectional view of the cassette shown in FIG. 8, showing a liner cavity cross-section at section 8B-8B.
Figure 8C:
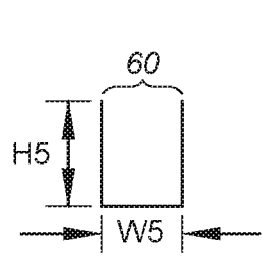
FIG. 8C is a diagrammatic sectional view of the cassette shown in FIG. 8, showing a liner cavity cross-section at section 8C-8C.
Figure 8D:
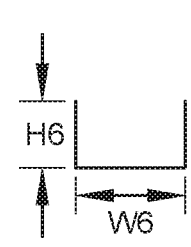
FIG. 8D is a diagrammatic sectional view of the cassette shown in FIG. 8, showing a liner cavity cross-section at section 8D-8D.
Figure 10:
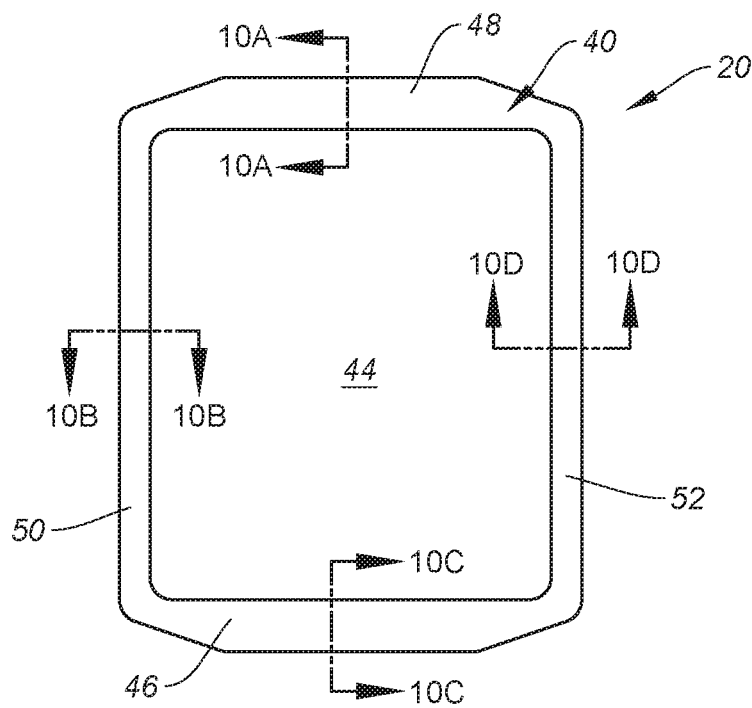
FIG. 10 is a diagrammatic top view of a film-dispensing cassette embodiment.
Figure 11:
FIG. 11 is a diagrammatic side view of the cassette embodiment shown in FIG. 10.
Figure 10A:
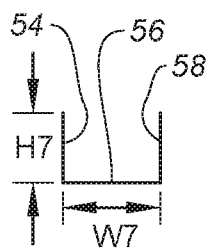
FIG. 10A is a diagrammatic sectional view of the cassette shown in FIG. 10, showing a liner cavity cross-section at section 10A-10A.
Figure 10B:
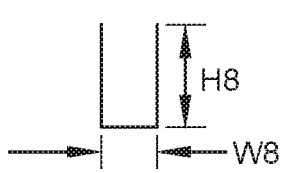
FIG. 10B is a diagrammatic sectional view of the cassette shown in FIG. 10, showing a liner cavity cross-section at section 10B-10B.
Figure 10C:
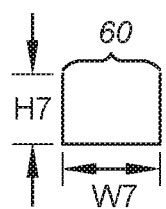
FIG. 10C is a diagrammatic sectional view of the cassette shown in FIG. 10, showing a liner cavity cross-section at section 10C-10C.
Figure 10D:
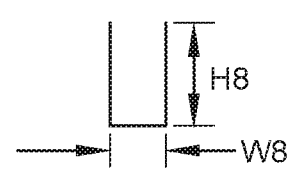
FIG. 10D is a diagrammatic sectional view of the cassette shown in FIG. 10, showing a liner cavity cross-section at section 10D-10D.

In some embodiments, a cassette 20 is provided having a balanced geometry. As described herein, "balanced" refers to a cassette 20 that is able to rest upon a substantially planar surface with little or no oscillation, such that it is generally stabilized (e.g., stays in a static position in the absence of an applied force). These embodiments are preferred in terms of stacking multiple cassettes 20, and/or configuring cassettes 20 for shipping and/or storage. In some embodiments, the cassette 20 has at least two portions with a substantially flat bottom cavity wall 56 that act as stabilizing means. Such regions are referred to as plateaus 57 as shown in FIG. 9. For example, a cassette 20 as exemplified in FIGS. 6-7 may have an H1 and H2 that are substantially equal, and/or an H3 and H4 that are substantially equal. In some embodiments the length of the region where such height is substantially constant (i.e. the plateau 57) is at least 10% of the length of the maximum depthwise direction have H1 substantially equal to H2 for at least about 10% of the length of region 50 and/or region 52. Alternatively, the length can be respective to the maximum widthwise dimension. In some embodiments, the plateau 57 where such height is substantially constant is at least 15%, at least 20%, at least 25%, at least 30%, at least 50%, or at least 75% of the maximum dimension (i.e., widthwise or depthwise).

In the aforementioned embodiments, the top panel 62 may also have similar plateaus 57 as the bottom cavity wall 56, such that cassettes 20 are balanced when stacked, and/or are easy to align in a stacked configuration.

In some of the aforementioned embodiments, the plateaus 57 can also help properly orient the cassette 20 into waste disposal device 22, where waste disposal device 22 has a receiving geometry suitably configured to mate with such plateaus 57.

Heights, for exemplary purposes, H7 and H8 vary between about 40 mm and about 70 mm. In some embodiments, H7 and H8 are between about 30 mm and about 50 mm. The ratio of H7 to H8 is between about 0.5 to about 1.0.

Widths W7 and W8 vary between about 10 mm and about 40 mm. In some embodiments, W7 and W8 are between about 20 mm and about 35 mm. The ratio of W7 to W8 is between about 0.25 to about 1.0.

In some embodiments, the ratio of H7 to H8 is between about 0.8 and 1.0, and the ratio of W7 to W8 is between about 0.8 and 1.0. The ratio of H7 to W7 is between about 1.0 to about 7.0, and the ratio of H8 to W8 is between about 1.0 to about 7.0. In some embodiments, the ratio of H7 to W7 is between about 1.0 to about 2.0, and the ratio of H8 to W8 is between about 1.0 to about 2.0. In some embodiments, the ratio of H7 to W7 will be less than or greater than the ratio of H8 to W8.

Figure 12:
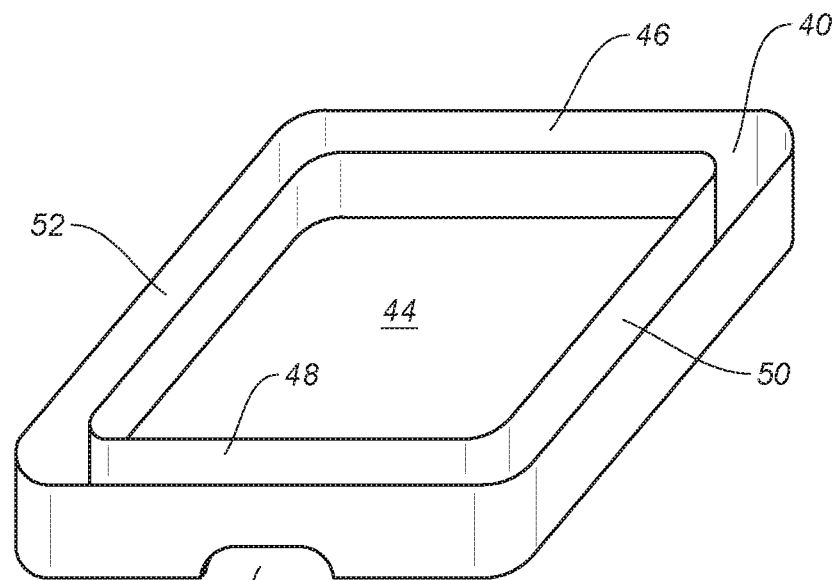
FIG. 12 is a diagrammatic perspective view of a cassette embodiment.
Figure 13:
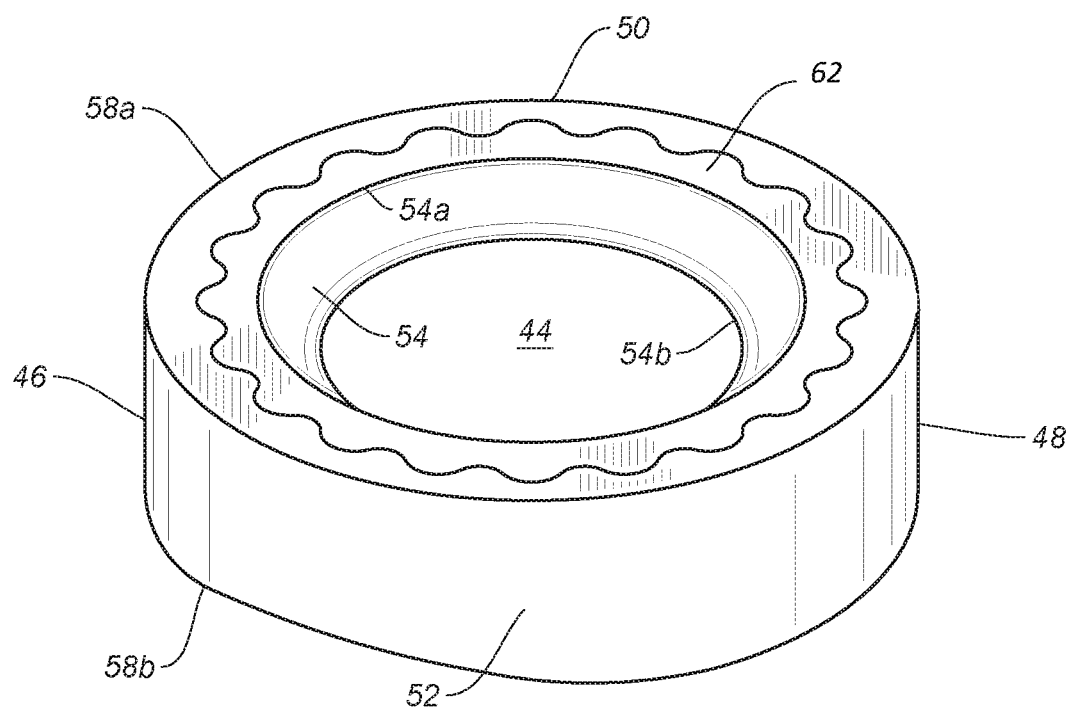
FIG. 13 is a diagrammatic perspective view of a cassette embodiment.

In some embodiments, the cross-sectional geometry of the liner cavity 40 may be asymmetrical in one or more of the first and second side regions 50, 52, respectively, and the forward and aft regions 46, 48, relative to the other regions or sectors 37, 39, 41, 43. The asymmetry amongst the regions 46, 48, 50, 52 or sectors 37, 39, 41, 43 can be utilized to accommodate structural elements within the waste disposal device 22. For example, some waste disposal device 22 embodiments may include structure for securing the cassette 20 within the device 22, which structure is disposed on a single side of the device. Embodiments of the present cassette 20 can be asymmetrically configured to provide clearance relative to the structure, and still provide the desired cassette 20 orientation within the device 22. For example, FIG. 12 shows an aft region with an asymmetrical configuration (e.g., a section 49 of the aft region 48 wherein the bottom cavity wall 56 deviates from the contour of the remainder of the aft region 48) relative to, for example, the forward region 46. In this type of liner cavity 40 configuration (and others like it), the cross-sectional area of the liner cavity 40 (i.e., the area of the cross-sectional plane that is perpendicular to inner cavity wall 54 and the outer cavity wall 58 that resides within the liner cavity 40) may not be substantially constant around the entire cassette perimeter; e.g., the cross-sectional area of the liner cavity 40 in the asymmetrical portion may be less than the cross-sectional area of the liner cavity 40 elsewhere around the perimeter of the cassette 20.

Figure 15:
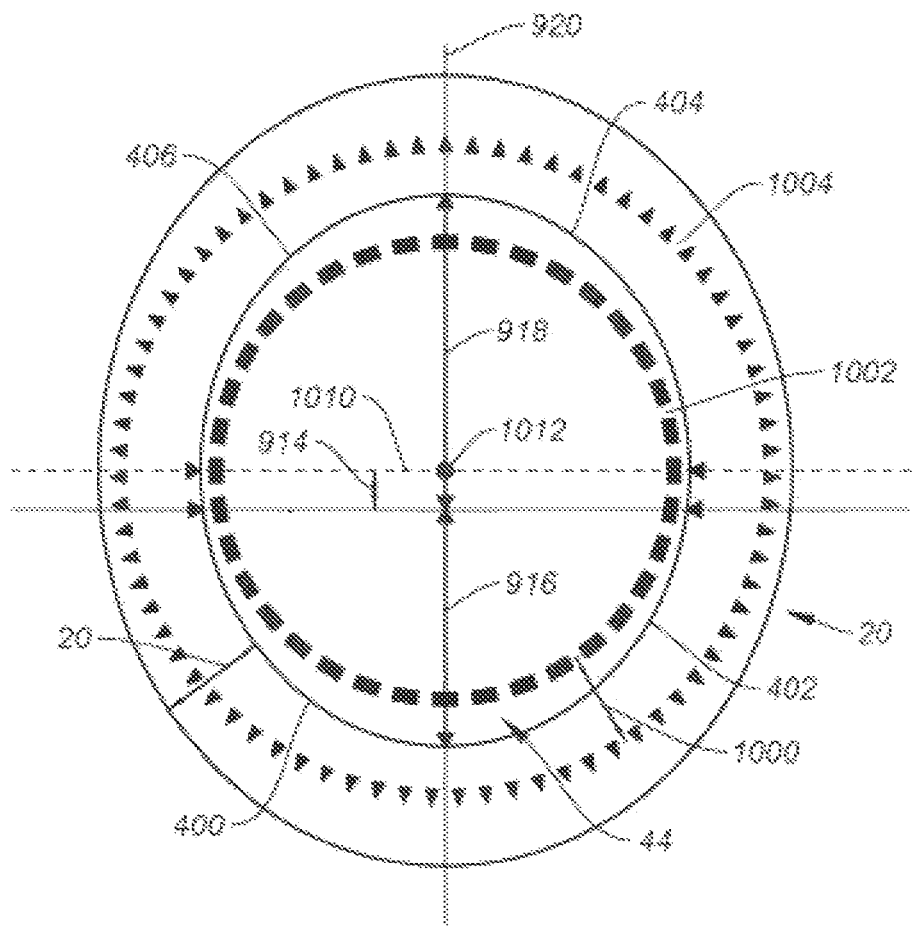
FIG. 15 is a diagrammatic section view of a cassette embodiment overlaid with a circle.
Figure 16:
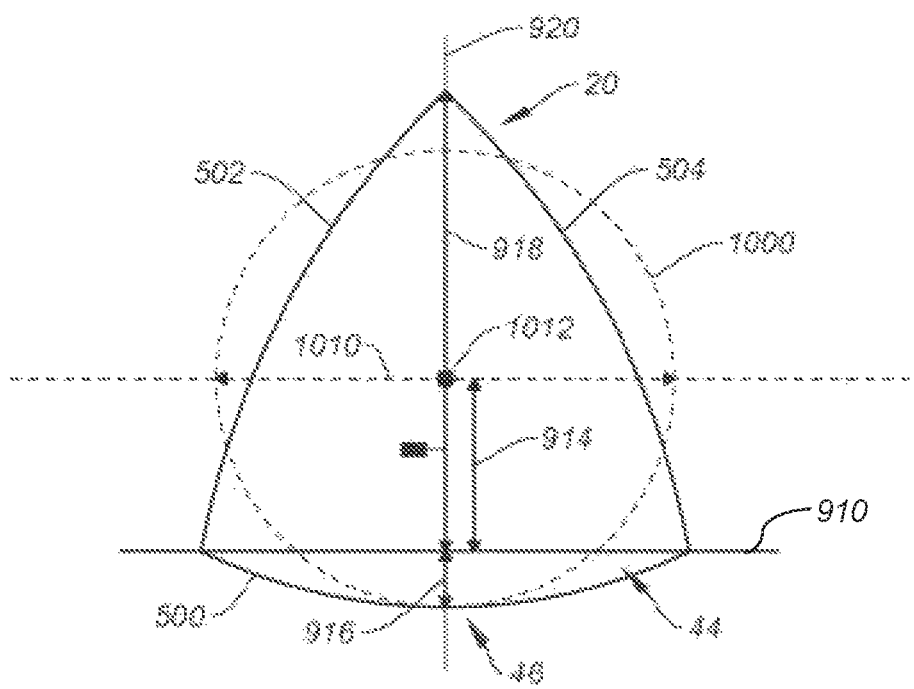
FIG. 16 is a diagrammatic section view of a cassette embodiment overlaid with a circle.

FIGS. 15-16 provide a top view of and overlays a cassette 1000 and an exemplary cassette 20 of the present disclosure. FIGS. 15-16 demonstrate embodiments having one or more splines configured to create a generally arcuate shape defining the front region 46, aft region 48 and/or side regions 50, 52, of cassette 20. For instance, four splines may be connected such that a first spline 400 and a second spline 402 are generally the same geometry, and a third spline 404 and fourth spline 406 are generally the same geometry but are different from the geometry of the first and second splines 400, 402. This exemplary combination of splines provides symmetry with respect to the depthwise axis 920. In certain embodiments, the cassette 20 may be shaped (due the configuration of the splines defining the front region 46) such that the maximum widthwise dimension 910 in cassette 20 is between the front region 46 of the cassette 20 and the midpoint 1012 of exemplary known round cassette 1000 length. In other embodiments, there may be more than four splines to further augment geometry, such as five, six, seven, eight, n, etc. In alternative embodiments, there are three splines 500, 502, 504, such that one spline does not correspond with another spline.

In some embodiments, one or more splines provide a maximum lengthwise dimension between the front region 46 and the midpoint 1012 (e.g., distance 916+distance 914), and/or a maximum widthwise dimension aligned with the maximum widthwise dimension 910.

The maximum widthwise dimension of the central passage 44 is greater than or equal to 100 mm. In further embodiments, the maximum widthwise dimension is between about 100 mm to about 140 mm. In further embodiments, the maximum widthwise dimension is greater than about 110 mm. In some embodiments, the maximum widthwise dimension of the central passage 44 is about 10% greater than the maximum widthwise dimension of known cassette 1000.

In further embodiments, splines are utilized to maximize the area of the central passage to reduce difficulty with inserting messy, large and/or odd-shaped waste such as diapers or waste disposing accoutrements such as scoops.

As shown in exemplary FIGS. 15-16, the cassette 1000 has a shorter central passage 1002 diameter in the widthwise and depthwise directions than the exemplary cassette 20 and likewise the outer wall 1004 has a smaller diameter. Cassette 20 in FIG. 16 also has its maximum widthwise dimension 910 situated below the midpoint 1012 of cassette 1000 a distance 914 such that the largest widthwise dimension 912 of the cassette 20 is closer to the front region 46 and thus helps reduce the distance a user's arm/hand travels to deposit the waste into central passage 44. In some embodiments, the location of the maximum widthwise dimension 910 being within the front region 46 is due to the variable cross-section permitting a narrower liner cavity 40 dimension in the front region than in the aft region. Distance 914 is at least 10 mm and can be up to about 70 mm. In another embodiment, the distance 916 between the intersection of the maximum widthwise dimension 910 and the depthwise axis 920 and the front region 46 of the central passage 44 is between about 20 mm and about 70 mm. In further embodiments, distance 916 is between about 50 mm and about 70 mm. In some embodiments, distance 916 is less than 60 mm.

The distance 918 between 1) the intersection of the maximum widthwise dimension 910 and the depthwise axis 920 and 2) the aft region 48 of the central passage (e.g., intersection of the inner cavity wall 54 of the aft region and the depthwise axis 920) is between about 50 mm and about 140 mm. In further embodiments, the distance 918 is between about 50 mm and about 90 mm. In further embodiments, the distance 918 is greater than 60 mm. In further embodiments, the distance 918 is greater than 70 mm. The distance 918 is greater than or equal to 50% of the entire length of the maximum depthwise dimension while distance 916 is less than or equal to 50% of the entire length of the maximum depthwise dimension.

FIGS. 15-16 also demonstrate cassette 20 having longer depthwise dimension such that larger waste can be deposited. The maximum depthwise dimension is located along the depthwise axis such that large waste does not need to be pivoted to enter central passage; it can be deposited straight-on from the front of the pail without undue pivoting of the waste. In some embodiments, the maximum depthwise dimension is the perpendicular bisector of the front edge (or front panel 32) of the waste disposal device 22.

FIG. 15 further demonstrates central passage 44 with a larger forward portion area than that of cassette 1000, where the forward portion is defined as the portion of the central passage 44 between the forward region 46 extending to the maximum widthwise dimension 910. This can be described as the area in the forward portion of the central passage 44 to the product of the maximum widthwise dimension and the distance 916 for given a constant perimeter of liner film 42. The equation is generally represented as:

Forward Area Aspect Ratio=(forward portion area)/ (910*916)

The Forward Area Aspect Ratio is between about 0.5 and about 1.5.

FIG. 15 demonstrates a second aspect ratio showing the redistribution of area with cassettes 20 of the present disclosure, focusing on the aft portion area. The aft portion area is defined as the portion of the central passage 44 between the aft region 48 and the widthwise axis extending through the midpoint 1012 of the central passage 44 (i.e. corresponding to distance 918 minus distance 914, as per FIG. 15). This can be described as the Aft Area Aspect Ratio of the area in the aft portion of the central passage 44 to the product of a first widthwise dimension 1010 at midpoint 1012 and distance 918 minus distance 914, for given a constant perimeter of liner film 42. Aft Area Aspect Ratio-(aft portion area)/ (1010*(918-914)

The Aft Area Aspect Ratio is between about 0.3 and about 2.0.

A further ratio of the Forward Area Aspect Ratio to the Aft Area Aspect Ratio is called the Maximum Area Ratio. The Maximum Area Ratio is between about 0.25 and about 5. Generally, this describes the relative distribution of the surface area of the central passage 44. In some embodiments, the Maximum Area Ratio is between about 0.25 and about 1. In further embodiments, the Maximum Area ratio is less than about 0.9. In other embodiments, the Maximum Area Ratio is between about 1 and about 5. In yet other embodiments, the Maximum Area Ratio is greater than about 1.1.

FIG. 16, although showing an exemplary embodiment of central passage 44, can also similarly illustrate the outer cavity wall 58. Both FIGS. 15-16 demonstrate geometries of the present disclosure that relocate surface area of the cassette 20 such that a larger opening space is located in the forward region and/or a larger opening space is located in the aft region in order to accommodate oddly shaped waste.

The above described liner cavity 40 configurations represent non-limiting examples of a liner cavity 40 having a cross-sectional geometry that varies at least at two different points along the perimeter of the cassette 20. The present disclosure is not limited to these examples. One skilled in the art understands that different geornettic configurations such as circles, ovals, arcuate shapes, undulating shapes, stepped shapes, chamfers, triangles, Reuleaux triangles, frusto-conical shapes, conics, other polygons and combinations thereof are within the scope of the present disclosure (in both vertical and/or horizontal cross-sectional orientations). For instance, in a generally triangular shaped cross-section, Wmax1 may describe the width of the panel defining the base of the triangle and Hmax1 might correlate to the perpendicular bisector of the base extending to the opposite vertex. One skilled in the art understands that the area of the triangle in this case would be ½*(Hmax1*Wmax1). In instances where a portion of the cross-section was, for example, generally triangular and a portion of the cross-section was, for example partially circular, in certain embodiments the cross-sectional area of each would be generally equal such that ½*(Hmax1*Wmax1)≈Π((Hmax2)/2)2). Other areas can be calculated via known mathematical calculations and/or via integration.

The varying cross-sectional geometry of the liner cavity 40 provides several advantages beyond those provided above. For example, the varying cross-sectional geometry makes it easy for a user to identify the correct orientation of the cassette 20 within the waste disposal device 22 (e.g., the at least partially asymmetric shape can only be inserted into the waste disposal device 22 in a single orientation), and yet permits a uniform volume of liner film 42 (i.e. such that any given cross-sectional slice along the z axis has substantially the same cross-sectional area) to disposed in the liner cavity 40 around the entire liner cavity perimeter. For those embodiments that have a substantially constant cross-sectional area around the perimeter of the cassette, the uniform volume of liner film 42 around the entire liner cavity perimeter facilitates uniform liner dispensing within the waste disposal device 22. The varying cross-sectional geometry of the liner cavity 40 can also make the cassette 20 easier to install into and be removed from the waste disposal device 22, e.g., a cassette 20 having a shallower front portion may be rotated relative to the waste disposal device 22 to facilitate removal, as opposed to a cassette 20 that installed/removed along a purely vertical axis. Also as described above, the varying cross-sectional geometry of the liner cavity 40 can also accommodate asymmetric positioning of structural elements within the waste disposal device 22. The varying cross-sectional geometry enables the cassette 20 to "sit" within an asymmetric cassette "seat", and still provide the desired cassette 20 orientation within the device 22.

The liner film 42 is a film formed in a closed perimeter configuration that extends a length. The closed perimeter configuration is such that the liner material has a continuous perimeter that extends lengthwise; e.g., the configuration may be described as "tubular". The cross-sectional configuration of the liner film 42 (i.e., the cross-sectional perimeter shape) may vary depending on the particular configuration. The liner film 42 is comprised of a material that is flexible, capable of being stored within the liner cavity 40, capable of being readily drawn out of the liner cavity 40, and capable of being formed in a closed configuration (e.g., knotted) as will be described below. A flexible plastic film is an example of an acceptable liner film 42. The liner film 42 can include one or more layers of polyethylene, polypropylene, polyester, EVA, EVOH, nylon, tie resin, and may further include additives such as carbon, calcium carbonate, talc, titanium dioxide and slip agents. Embodiments of the liner film 42 may include agents that mask odor such as fragrance, mitigate odors including odor absorbers and odor absorbers, etc.

The liner film 42 is stored within the liner cavity 40 in an orientation that allows incremental portions of the liner to be drawn out of the liner cavity 40. The cassette 20 may be configured such that the liner film 42 can be drawn out of the liner cavity 40 through an opening disposed around the cassette perimeter at the opening 60; e.g., the cassette 20 diagrammatically shown in FIG. 3 includes a top panel 62 that substantially covers the opening 60, creating the opening through which the liner film 42 is drawn out of the liner cavity 40. The present cassette 20 is not limited to any particular liner path configuration; e.g., liner film 42 may alternatively be drawn out of the liner cavity 40 through the bottom cavity wall, inner cavity wall 54, or the outer cavity wall 58 of the liner cavity 40. The present cassette 20 is also not limited to any particular manner for arranging the liner film 42 within the liner cavity 40 (e.g., folded, pleated, etc.), provided the liner film 42 can be readily drawn out from the liner cavity 40 on demand by the user.

In some embodiments, the cassette 20 includes a top panel 62 to assist with containing liner film 42 within the liner cavity 40 prior to and during use until the liner film 42 is exhausted. The top panel 62 also assists in controlling the dispensation of the liner film 42. In embodiments of the present disclosure where the maximum width varies around the perimeter of cassette 20, the top panel 62 can also vary to provide opening 60 with generally the same width at any given point around the cassette 20 perimeter. The top panel 62 can be integral with the cassette 20 via a living hinge and/or can be connected to the cassette via ultrasonic welding, heat, adhesives, or mechanically attached with snap-fits, detents, press-fits, etc. . . .

U.S. Pat. No. 4,934,529 to Tannock, and U.S. Pat. No. 5,056,293 to Richards et al. describe methods for loading liner film into cassettes and are hereby incorporated by reference. Loading the liner film 42 into the liner cavity 40 requires moving liner film 42 over a mandrel such that the liner film 42 rests outward of the mandrel. The mandrel is sized less than the diameter of the liner film 42 but is sized such that the liner film 42 is able to move along the length of the mandrel (as per process parameters and mechanics) without undue resistance. The mandrel is sized and shaped similarly to the inner cavity wall 54 of cassette 20 (i.e. taking a horizontal slice in the XY plane of the mandrel that is proximal and/or adjacent and inner cavity wall 54) such that the liner film 42 travels along the length of the mandrel towards the open end of cassette 20 such that liner film 42 can be loaded into liner cavity 40. The peripheral length of the liner film 42 is slightly greater than the peripheral length of the inner cavity wall 54 and the peripheral length of the liner film 42 is slightly less than peripheral length of the outer cavity wall 58. After the appropriate length of liner film 42 has been received into liner cavity, the top panel 62 is placed over the opening 60 to at least partially contain the liner film 42 in the liner cavity 40.

The top panel 62 may optionally include a removal portion 66 such that it is frangible or peelable, such as a peel tab, label, sticker, perforation or tear strip. Removal portion 66 contains the liner film placed inside the liner cavity 40 until the removal portion is removed to reveal the cavity opening. In certain embodiments, the removal portion 66 is located adjacent the outer perimeter (i.e. proximal the outer cavity wall 58). In other embodiments, the removal portion 66 is located adjacent the inner perimeter (i.e. proximal the inner cavity wall 54 and/or the central passage 44). In yet other embodiments, the perforation or tear strip (e.g., removal portion 66) is located towards the middle portion of the top panel 62, bottom cavity wall 56, outer cavity wall 58 or inner cavity wall 54.

Figure 14:
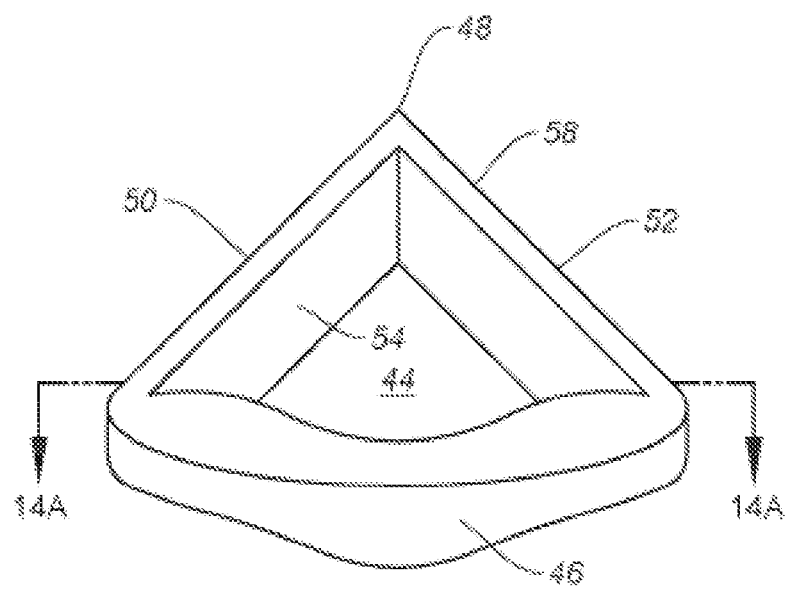
FIG. 14 is a diagrammatic perspective view of a cassette embodiment.
Figure 14A:
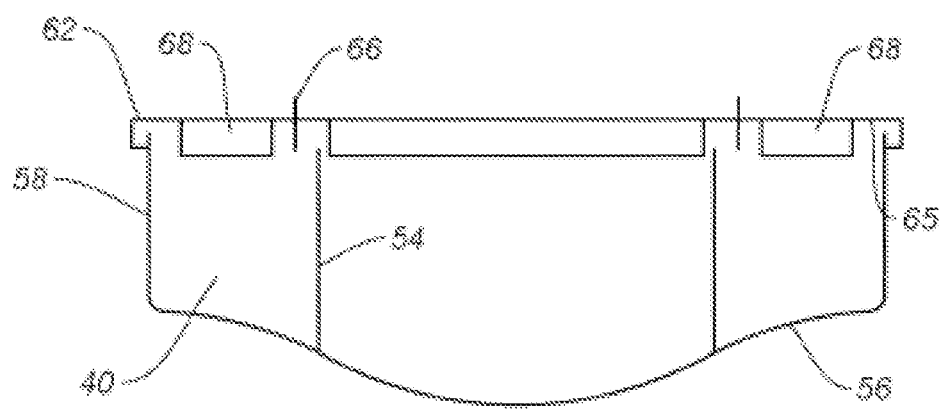
FIG. 14A is a diagrammatic section view of the cassette shown in FIG. 14, showing a line cavity cross-section at 14A-14A.

As the liner film 42 is loaded into the liner cavity 40, the liner film 42 may creep outward from the liner cavity and may present issues when the top panel 62 is placed and connected onto the cassette 20 (i.e. the liner film 42 could be pinched at a point where the top panel 62 is connected to the cassette 20). To minimize quality issues, the assembly process may provide for pins (or fingers) that help depress the liner film 42 into the liner cavity 40 as it is being loaded. In some embodiments, the top panel 62 has apertures sized to receive such pins such that the top panel 62 can pass along the pins and ultimately connect to the cassette 20 prior to removal of the pins (i.e. such that the liner film 42 is depressed to a position away from the connection point(s) between the top panel 62 and cassette 20 to prevent pinching). In alternate embodiments, pins or fingers may be designed to fit around the top panel 62 (i.e. above and/or below) or have a slim profile to avoid apertures in the top panel. In an exemplary embodiment shown in FIG. 13, the top panel 62 has an undulating shape such that the pins or fingers can fit within local at least one concave portion of the top panel 62. In some embodiments, the top panel 62 has at least 2 concave portions. In some such embodiments, the pins or fingers have side action (i.e., lateral or rotational motion) as opposed to solely linear vertical motion requiring the apertures in the top panel 62. In yet other embodiments as exemplified in FIG. 14A, the bottom surface 65 of top panel 62 (i.e. the surface facing the liner cavity 40 and in contact with liner film 42) may have ribs or protrusions 68 to help push liner film 42 downward into the liner cavity 40 and away from connection point(s) between the top panel 62 and cassette 20.

The present cassette 20 can be removed and replaced from the waste disposal device 22 as needed. For example, in the waste disposal device 22 embodiment shown in FIGS. 1 and 2, the cassette 20 can be replaced by opening the lid 26, removing the empty cassette 20 from the housing (if necessary), and placing an unused cassette 20 into the housing 24. The user then withdraws a length of the liner film 42 from the liner cavity 40, feeds it through the central passage 44, and into the inner storage region 29, so that the free end of the liner film 42 is disposed near the lower end of the bin 33 a. The user then closes off the free end of the liner film 42 to form a liner film "bag" (e.g., by tying the liner film 42 into a knot adjacent the free end) and closes the bin 33 a. In this configuration, the waste disposal device 22 (and specifically the liner film 42) is ready to receive waste such as, but not limited to, disposable diapers, nappies, training pants, feminine hygiene articles, and incontinence products. Gravitational forces urge whatever waste is deposited into the liner film bag toward the closed-off free end of the liner film bag. When the liner film bag is full of waste, the upper end of the liner film 42 is separated from the supply of liner film 42 (e.g. by cutting the liner film 42 at a point above the stored waste), and the bag is removed from the waste disposal device 22. The just-separated end of the liner film 42 may then be closed (e.g., by knot or fastener) and the bag disposed of. The process is then repeated; e.g., the user withdraws another length of the liner film 42 from the liner cavity 40, drawing it through the cassette central passage 44 and into the bin 33 a. The user then closes off the free end of the liner material to form a new liner film bag.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For instance, specific embodiments providing geometries in a first configuration could be flipped or rotated. Further, different combinations of different geometries are also within the scope of the present disclosure. Therefore, it is intended that the invention not be limited to the particular embodiment(s) disclosed herein as the best mode contemplated for carrying out this invention.

The invention claimed is:

1. A film-dispensing cassette for a waste disposal device, comprising:
    a body configured to be removably coupled to a housing of a waste disposal device, the body defining:
        a central passage;
        a liner cavity for containing a supply of liner film, said liner cavity extending around said central passage, said liner cavity having a cross-sectional geometry that varies around a perimeter of said body at least at two different points, the liner cavity defined by:
            an inner cavity wall defining a periphery of the central passage on one side and an inner surface of the liner cavity on an opposite side, at least a portion of the inner cavity wall being curved along the periphery of the central passage,
            a bottom cavity wall extending from the inner cavity wall, the bottom cavity wall connected to the inner cavity wall along the periphery of the central passage,
            an outer cavity wall extending upwardly from the bottom cavity wall, and
            an opening between an upper edge of the inner cavity wall and an upper edge of the outer cavity wall, the opening having a variable width along the perimeter of the body; and
        a top panel connected to the upper edge of the inner cavity wall or the upper edge of the outer cavity wall, the top panel having an inconstant width along the perimeter of the body.

2. A film-dispensing cassette for a waste disposal device, comprising:
    a body configured to be removably coupled to a housing of a waste disposal device, the body defining:
        a central passage;
        a liner cavity for containing a supply of liner film, said liner cavity extending around said central passage, said liner cavity having a cross-sectional geometry that varies around a perimeter of said body at least at two different points, the liner cavity defined by:
            an inner cavity wall defining a periphery of the central passage on one side and an inner surface of the liner cavity on an opposite side, the inner cavity wall being circular along the periphery of the central passage,
            a bottom cavity wall extending from the inner cavity wall, the bottom cavity wall connected to the inner cavity wall along the periphery of the central passage,
            an outer cavity wall extending upwardly from the bottom cavity wall, and
            an opening between an upper edge of the inner cavity wall and an upper edge of the outer cavity wall, the opening having a variable width along the perimeter of the body; and
        a top panel connected to the upper edge of the inner cavity wall or the upper edge of the outer cavity wall, the top panel having an inconstant width along the perimeter of the body.

3. The cassette according to claim 2, wherein the inner cavity wall, the outer cavity wall and the bottom cavity wall have a solid wall configuration.

4. The cassette according to claim 2, wherein the inner cavity wall, the outer cavity wall, and the bottom cavity wall are formed as a continuous one-piece structure.

5. The cassette according to claim 2, wherein the bottom cavity wall extends perpendicular to the outer cavity wall.

6. The cassette according to claim 2, wherein a distance between the inner cavity wall and the outer cavity wall varies.

7. The cassette according to claim 2, wherein the inner cavity wall and the outer cavity wall extend upwardly in a parallel manner from the bottom cavity wall.

8. The cassette according to claim 2, wherein the central passage has a central axis, the body has a first axis and a second axis, the first axis, the second axis and the central axis intersecting orthogonally relative to each other at a center point of the central passage, the first axis and the second axis extending in a plane normal to the central axis, the liner cavity being symmetrical relative to at least one of the first axis and the second axis.

9. The cassette according to claim 2, wherein the top panel is attached to the upper edge of the inner cavity wall.

\* \* \* \* \*